(12) United States Patent
Morales et al.

(10) Patent No.: US 9,735,576 B2
(45) Date of Patent: Aug. 15, 2017

(54) METHOD AND SYSTEM FOR ESTABLISHING A POWER FEED TO SYSTEMS DURING OPERATION

(71) Applicant: Amazon Technologies, Inc., Reno, NV (US)

(72) Inventors: Osvaldo P. Morales, Seattle, WA (US); Robin McCulloch, Mornington (IE); Patrick Hughes, Celbridge (IE)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/942,761

(22) Filed: Nov. 16, 2015

(65) Prior Publication Data
US 2016/0072286 A1    Mar. 10, 2016

Related U.S. Application Data

(63) Continuation of application No. 14/228,116, filed on Mar. 27, 2014, now Pat. No. 9,190,870, which is a
(Continued)

(51) Int. Cl.
*H02J 7/00* (2006.01)
*H02J 9/00* (2006.01)
(Continued)

(52) U.S. Cl.
CPC ............ *H02J 3/005* (2013.01); *G06F 1/26* (2013.01); *H02J 3/00* (2013.01); *H02J 9/00* (2013.01); *H02J 9/062* (2013.01); *Y10T 307/615* (2015.04)

(58) Field of Classification Search
CPC .................. H02J 3/005; H02J 9/00
(Continued)

(56) References Cited

U.S. PATENT DOCUMENTS 4,060,735 A    11/1977    Pascucci et al.
5,675,194 A    10/1997    Domigan
(Continued)

FOREIGN PATENT DOCUMENTS

| CN | 101320913 | 10/2008 |
| JP | 2008082723 | 4/2008 |
| JP | 2009225546 | 10/2009 |

OTHER PUBLICATIONS

Office Action from Chinese Application No. 201180046665.0, Issued Oct. 17, 2014, English and Chinese versions, pp. 1-39.
(Continued)

*Primary Examiner* — Carlos Amaya
(74) *Attorney, Agent, or Firm* — Robert C. Kowert; Meyertons, Hood, Kivlin, Kowert & Goetzel, P.C.

(57) ABSTRACT

A method of adding a power feed to electrical systems includes coupling a set of input lines to a power source such that the input lines are connected to at least one phase of AC power from the power source, and coupling a set of backfeed lines to an output receptacle in a power distribution unit. The output receptacle may be connected in parallel with at least one other output receptacle that is supplying primary power to systems in the data center. The set of backfeed lines and the set of input lines may be tested to determine a match between a pair of lines in the set of backfeed lines and a pair of lines in the set of input lines. Determining the match may include matching the phase of the pair of backfeed lines with the phase of the pair of input lines.

20 Claims, 11 Drawing Sheets

Related U.S. Application Data continuation of application No. 12/892,750, filed on Sep. 28, 2010, now Pat. No. 8,686,594.

(51) Int. Cl.
  *H02J 3/00* (2006.01)
  *G06F 1/26* (2006.01)
  *H02J 9/06* (2006.01)

(58) Field of Classification Search
  USPC ..................................... 307/64, 80, 87, 147
  See application file for complete search history.

(56) References Cited

U.S. PATENT DOCUMENTS

| | | | |
|---|---|---|---|
| 6,008,971 | A | 12/1999 | Duba et al. |
| 6,150,736 | A | 11/2000 | Brill |
| 6,992,247 | B2 | 1/2006 | Rasmussen et al. |
| 7,215,535 | B2 | 5/2007 | Pereira |
| 7,560,831 | B2 | 7/2009 | Whitted et al. |
| 8,686,594 | B2 | 4/2014 | Morales et al. |
| 2002/0070610 | A1 | 6/2002 | Bersiek |
| 2002/0135233 | A1 | 9/2002 | Cratty |
| 2005/0162019 | A1 | 7/2005 | Masciarelli et al. |
| 2005/0200205 | A1 | 9/2005 | Winn et al. |
| 2006/0146581 | A1 | 7/2006 | Murphy |
| 2007/0046103 | A1 | 3/2007 | Belady et al. |
| 2008/0018175 | A1 | 1/2008 | McNamara et al. |
| 2009/0314541 | A1 | 12/2009 | Jones et al. |
| 2010/0141038 | A1 | 6/2010 | Chapel et al. |
| 2010/0235671 | A9 | 9/2010 | Jain |
| 2012/0181869 | A1 | 7/2012 | Chapel et al. |

OTHER PUBLICATIONS

U.S. Appl. No. 12/892,750, filed Sep. 28, 2010, Osvaldo P. Morales.
U.S. Appl. No. 13/626,723, filed Sep. 25, 2012, Peter F. Ross.
U.S. Appl. No. 13/071,488, filed Mar. 24, 2011, Michael P. Czamara.
Office Action from Japanese Application No. 2013-530182, Mailed Apr. 1, 2014, English and Japanese versions, pp. 1-7.
International Search Report and Written Opinion for PCT/US11/51273, Dated Jan. 26, 2012, Amazon Technologies, Inc., pp. 1-11.
U.S. Appl. No. 14/228,116, filed Mar. 27, 2014, Osvaldo P. Morales, et al.
Extended European Search Report from Application No. 11831160.4, Dated Jul. 25, 2016, Amazon Technologies, Inc., pp. 1-8.

METHOD AND SYSTEM FOR ESTABLISHING A POWER FEED TO SYSTEMS DURING OPERATION

This application is a continuation of U.S. patent application Ser. No. 14/228,116, filed Mar. 27, 2014, now U.S. Pat. No. 9,190,870, which is continuation of U.S. application Ser. No. 12/892,750, filed Sep. 28, 2010, now U.S. Pat. No. 8,686,594, both of which are hereby incorporated by reference in their entirety.

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Primary power systems for computer systems in operation typically need to be maintained or reconfigured from time to time. Some data centers, for example, have "single threaded" distribution via the electrical power supply to the floor and/or to the rack, and in which maintenance can only be performed when the components using power in the data center, such as servers, are shut-off. The down-time associated with maintenance and reconfiguration of primary power systems in a data center may result in a significant loss in computing resources. In some critical systems such as hospital equipment and security systems, down-time may result in significant disruption and, in some cases, adversely affect health and safety.

Figure 1:
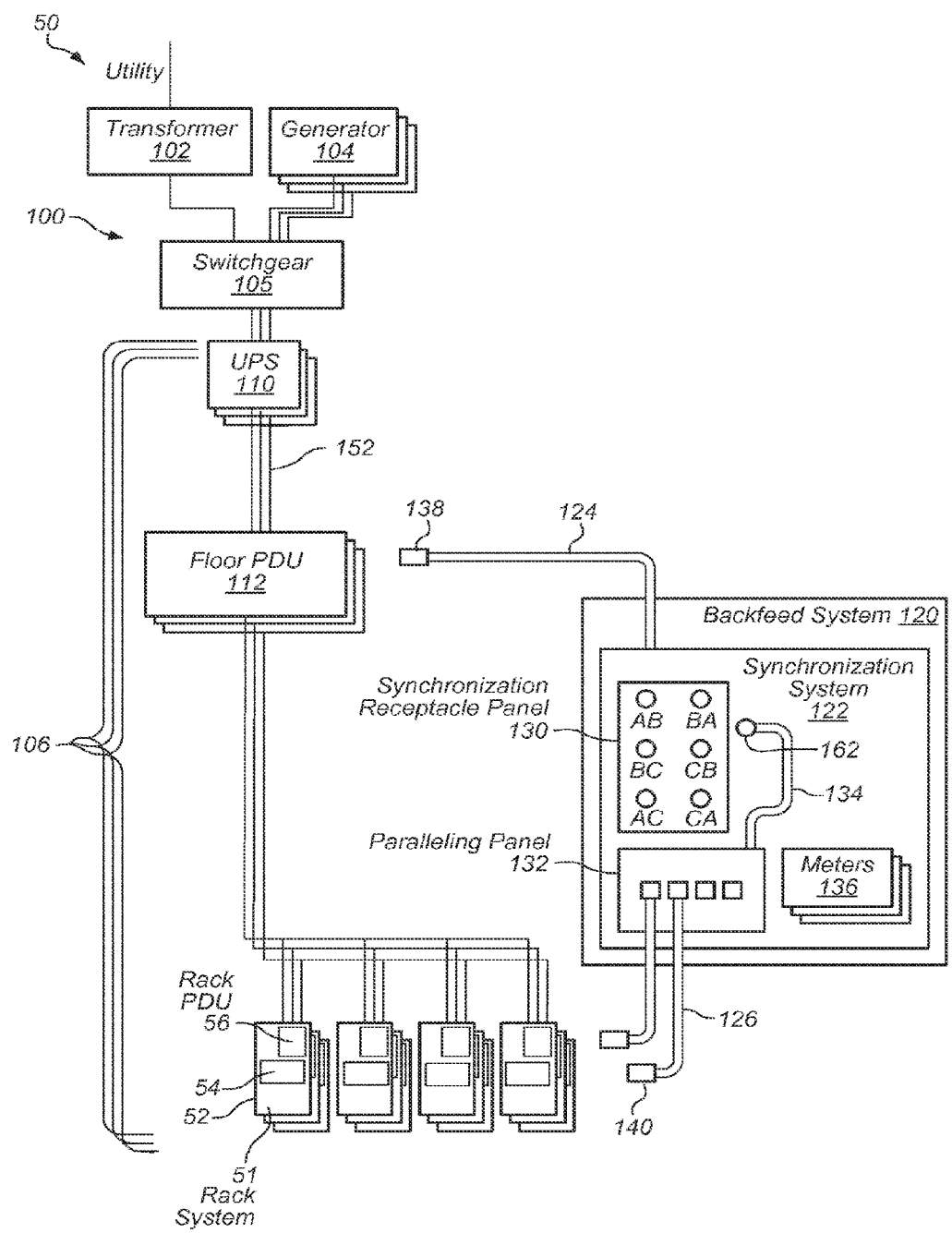
FIG. 1 is a block diagram illustrating one embodiment of a data center including a backfeed unit that may be used to establish a power feed for computer systems in the data center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and systems for establishing feeds to electrical systems, such as computer systems in a data center, are disclosed. According to one embodiment, a method of adding a power feed to systems while the systems are in operation includes coupling a set of input lines to a power source such that the input lines are connected to at least one phase of AC power from the power source, and coupling a set of backfeed lines to an output receptacle in a power distribution unit. The output receptacle may be connected in parallel with other output receptacles on the power distribution unit that are supplying primary power to systems in the data center. The set of backfeed lines and the set of input lines may be tested to determine a match between a pair of lines in the set of backfeed lines and a pair of lines in the set of input lines. Determining the match may include matching the phase of the pair of backfeed lines with the phase of the pair of input lines. The pair of backfeed lines may be coupled to the matching pair of input lines while primary power is maintained to the systems and the systems are operating.

According to one embodiment, a method of maintaining electrical power to systems in operation during reconfiguration or maintenance of a power distribution system for the systems includes coupling a set of input lines to a power source such that the input lines are connected to at least one phase of AC power from the power source, and coupling a set of feed lines to a power distribution unit that is supplying primary power to one or more systems in the data center. The set of feed lines and the set of input lines may be tested to determine a match between a pair of lines in the set of feed lines and a pair of lines in the set of input lines. The pair of feed lines may be coupled to the matching pair of input lines while primary power is maintained to the systems and the systems are operating. Primary power may be disconnected or disabled at one or more points in the primary power chain.

According to one embodiment, a system for supplying power during reconfiguration or maintenance of a primary power system includes a feed cable including a set of feed lines, an input cable including a set of input lines, a synchronization system, and a coupling system. The set of input lines may couple with a power source. The set of feed lines may couple with an output receptacle of a power distribution unit. The synchronization system can be used to test lines of the feed cable and lines of the input cable to establish a match of phase and polarity between a pair of lines in the set of feed lines and a pair of lines in the set of input lines. The coupling system may be used to couple a pair of feed lines to a matching pair of input lines.

According to one embodiment, a system for supplying power during reconfiguration or maintenance of a primary power system includes a set of input lines, a phase selection panel, and a set of feed lines. The set of input lines can supply power in at least two phases from a source power supply. The phase selection panel includes two or more receptacles coupled to the set of input lines. The receptacles can supply power from the source power supply in different phases and different polarities. The set of feed lines can supply power from the phase selection panel to electrical loads.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, a "match", in the context of matching sets of power lines, means that the characteristics between the sets of power lines are similar to one another within acceptable limits. A match does not require that the measurements of the two items be precisely equal. In some embodiments, the acceptable variance levels for a match are predetermined. For example, in one embodiment, for a voltage level match, an input power line may be predetermined to match a feed line if the difference in measured voltage between the two lines is 7 volts or less. Various characteristics, such as voltage, waveform, etc. may be used as criteria to determine a match.

As used herein, a "cable" includes any cable, conduit, or line that carries one or more conductors and that is flexible over at least a portion of its length. A cable may include a connector portion, such as a plug, at one or more of its ends.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "primary power" means any power that can be supplied to an electrical load, for example, during normal operating conditions.

As used herein, "floor power distribution unit" refers to a power distribution unit that can distribute electrical power to various components in a computer room. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "remote power panel" means any panel, device, module, component, or combination thereof, that can be used to transfer or distribute electrical power from one or more input conductors to one or more output conductors. In certain embodiments, a remote power panel includes main lug only ("MLO") panel conductors. A remote power panel may be housed in an enclosure, such as a cabinet.

As used herein, "reserve power" means power that can be supplied to an electrical load upon the failure of, or as a substitute for, primary power to the load.

As used herein, a "secondary feed" refers to any feed that supplies power that is separate from a primary power system for at least a portion of a primary power chain. As used herein, a "tertiary feed" refers to any feed that supplies power that is separate from two power systems (such as a primary power system and a reserve power system) for at least a portion of the two power system chains. In some embodiments, a secondary power feed or tertiary feed may be completely independent of the primary power distribution system. In some embodiments, however, a secondary feed or tertiary feed is not completely independent of the primary power distribution system. For example, both the primary power distribution system and a secondary feed may both receive power from the same utility feed, the same step-down transformer (for example, a primary-side transformer), the same uninterruptible power supply (for example, a primary-side), etc.

As used herein, "source power" includes power from any source, including but not limited to power received from a utility feed. In certain embodiments, "source power" may be received from the output of a transformer.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

In some embodiments, a power feed is established to electrical systems while systems are live. Systems receiving power from an added feed may be of various types. Examples include hospital equipment, utility systems, security systems, military systems, telecommunications systems, or electronic commerce systems. In certain embodiments, an additional feed is provided to a critical system, such as a life support system. In some embodiments, the systems are computer systems in a data center. An additional power feed may allow the primary power system to be temporarily taken off-line for reconfiguration or maintenance of, for example, the primary power system. In some embodiments, the feed is accomplished by paralleling a primary power distribution system over a portion of a power distribution chain.

In some embodiments, a backfeed system is used to establish a feed to electrical systems. FIG. 1 is a block diagram illustrating one embodiment of a data center including a backfeed system that may be used to establish a secondary power feed for computer systems in the data center. Data center 50 includes rack systems 51 and primary power side 100. Primary power side 100 includes transformer 102, generators 104, and switchgear 105, and primary power systems 106. Rack systems 51 include racks 52. Sets of computer systems 54 in racks 52 may perform computing operations in data center 50. Computer systems 54 may be, for example, servers in a server room of data center 50. Computer systems 54 in racks 52 may each receive power from one of primary power systems 106. In one embodiment, each of primary power systems 106 corresponds to, and provides power to, the servers in one room in data center 50. In one embodiment, each of primary power systems 106 corresponds to, and provides power to, one of rack systems 51 in data center 50.

Primary power systems 106 each include UPS 110 and floor power distribution unit 112. Floor power distribution unit 112 provides power to various of rack systems 51. In some embodiments, floor power distribution unit 112 includes a transformer that transforms the voltage from switchgear 105. Each of rack systems 51 may include a rack power distribution unit 56. Rack power distribution units 56 may distribute power to computer systems 54.

Transformer 102 is coupled to a utility feed. The utility feed may be a medium voltage feed. In certain embodiments, the utility feed is at a voltage of about 13.5 kilovolts or 12.8 kilovolts at a frequency of about 60 Hz. Generators 104 may provide power to primary power systems 106 in the event of a failure of utility power to transformer 102. In one embodiment, one of generators 104 provides back-up power for each of primary power systems 106. UPS 110 may provide uninterrupted power to racks 52 in the event of a power failure upstream from UPS 110.

For illustrative purposes, three primary power systems are shown in FIG. 1 (for clarity, details of only the front primary power system 106 are shown). The number of primary power systems 106 on primary power side 100 may vary, however. In certain embodiments, a primary power side may include only one primary power system. In addition, the number of power distribution units, UPSs, switchgear apparatus may vary from embodiment to embodiment (and, within a given embodiment, from system to system). In some embodiments, primary power system 106 includes many floor power distribution units 112. As another example, a primary power system may have one UPS that can supply power to many floor power distribution units.

Data center 50 includes backfeed unit 120. Backfeed system 120 may be used to provide a secondary power feed to rack systems 51. The secondary power feed may be provided, for example, during reconfiguration or maintenance of primary power systems 106. Backfeed system 120 includes synchronization system 122, input cable 124, and output cables 126. Synchronization system 122 includes synchronization receptacle panel 130, paralleling panel 132, backfeed unit input cable 134, and meters 136. Input cable 124 includes input coupling device 138. Backfeed cables 126 include backfeed plugs 140.

Meters 136 may be used to measure power characteristics, such as voltage, line voltage, wave form, frequency, phase sequence, and phase angle, within synchronization system 122, or on the input and/or output sides of backfeed system 120. In some embodiments, one or more of meters 136 are integrated into an enclosure for backfeed system 120. In other embodiments, one or more of meters 136 is a stand alone measurement device, such as a stand-alone oscilloscope.

Figure 2A:
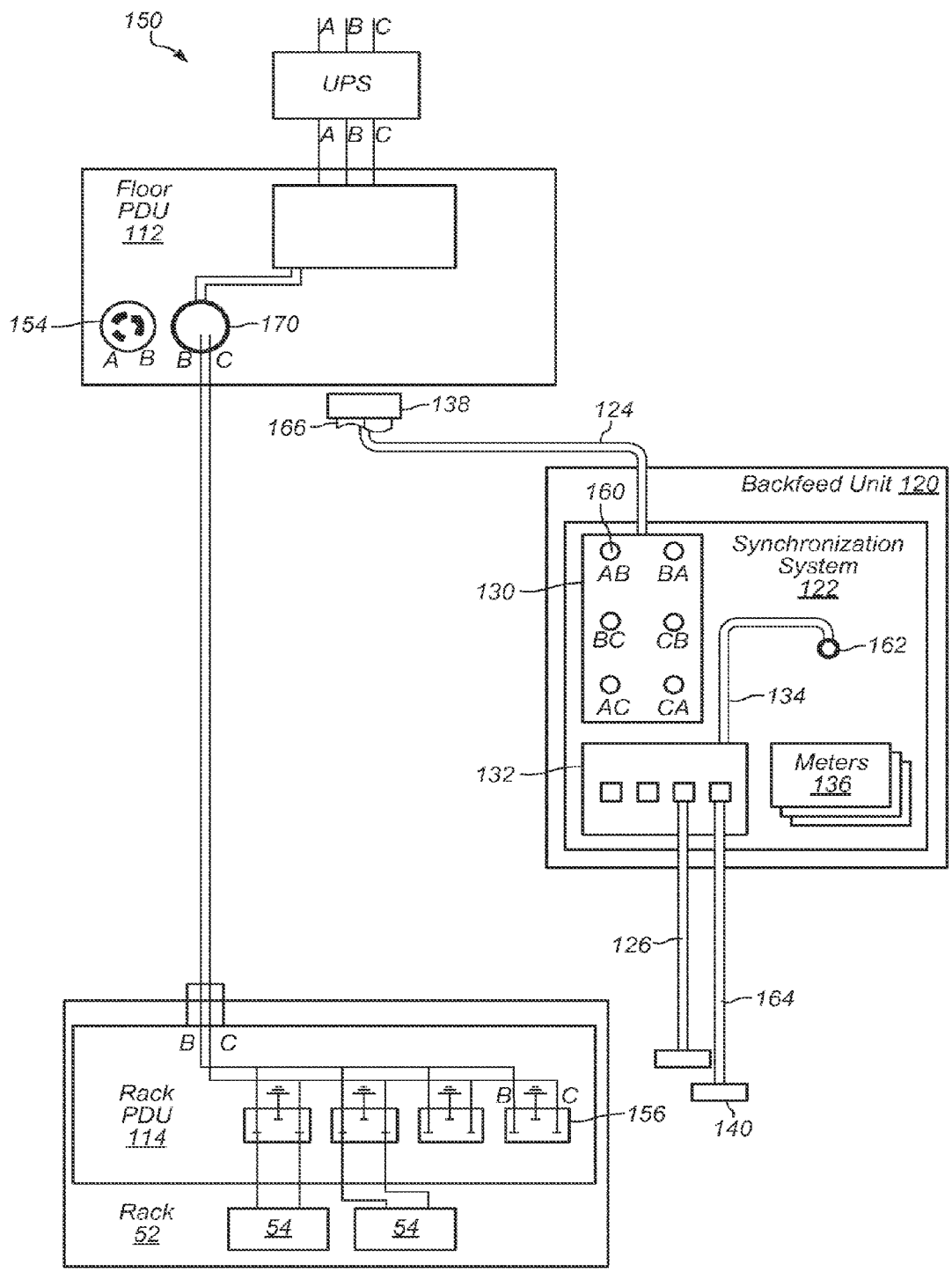
FIG. 2A-E are schematic diagrams illustrating one embodiment of establishing a backfeed to a rack power distribution unit.
Figure 2B:
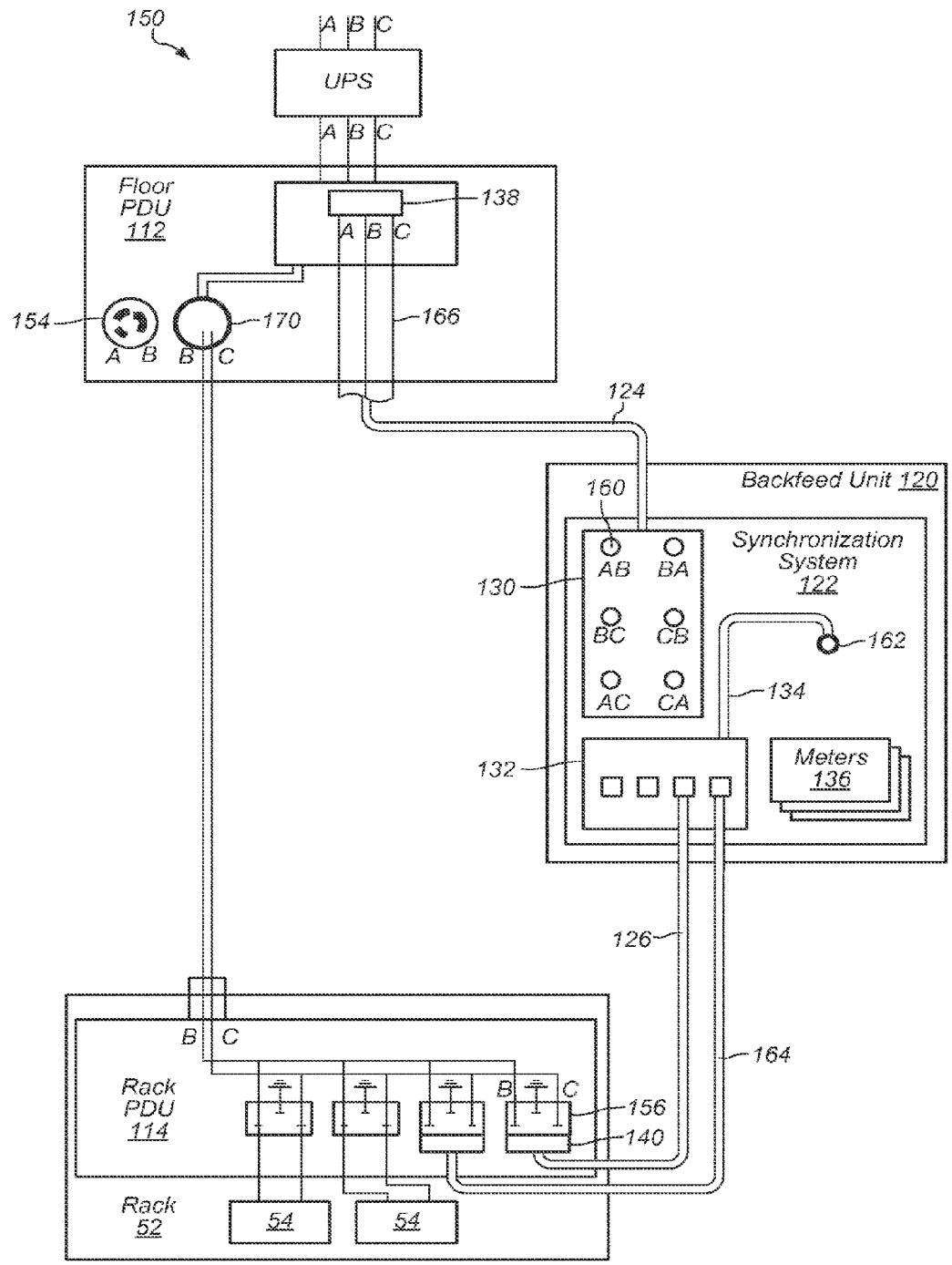
Figure 2C:
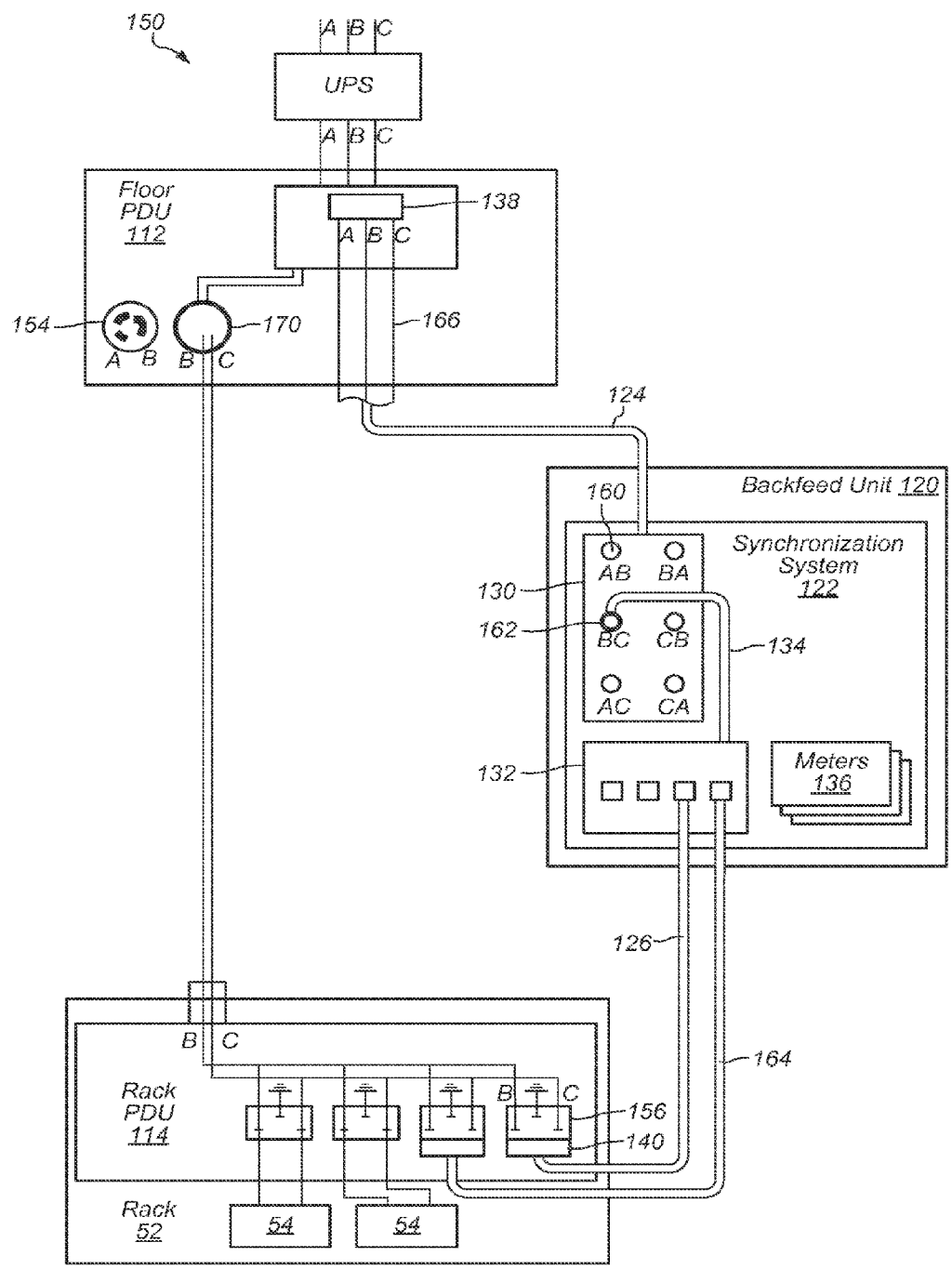

In some embodiments, a backfeed unit supplies a secondary power by backfeeding one or more receptacles in a power distribution unit. In some embodiments, a backfeed unit is used to create a secondary power feed by tapping into a floor power distribution unit. FIG. 2A-C are schematic diagrams illustrating one embodiment of establishing a backfeed to a rack power distribution unit. FIG. 2A illustrates one embodiment of a portion of data center including a backfeed unit for a rack power distribution unit. Data center 150 includes computer systems 54 in rack 52, primary power system 106, and backfeed system 120. Primary power system 106 includes UPS 110, floor power distribution unit 112, and rack power distribution unit 56. Rack power distribution unit 56 may supply power to computer systems 54. Primary power distribution system 106 may be similar to that described above relative to FIG. 1. UPS 110 may receive power from a transformer, such as transformer 102 described above relative to FIG. 1.

UPS may receive three-phase power from a transformer, such as transformer 102 illustrated in FIG. 1. UPS 110 may supply three-phase power to floor power distribution unit 112 through lines 152. In FIG. 2A, each of the three lines is designated A, B, or C to indicate one of the three phases of power received from UPS 110.

Floor power distribution unit 112 includes floor PDU receptacles 154. Floor PDU receptacles 154 may be used to supply power to various racks in data center 150. In one embodiment, floor PDU receptacles 154 are NEMA L6-30R type. Each of the various receptacles on floor power distribution unit 112 may carry two phase lines and one ground. In FIG. 2A, each of the six receptacles is in indicated with one of the six phase combinations, namely, AB, BC, AC, BA, CB, or CA.

In the embodiment shown in FIG. 2A, combinations for illustrative purposes, floor PDU receptacles 154 are shown on floor power distribution unit 112 for only two of the six phase combinations. A floor power distribution unit may, however, have any number of receptacles for each phase combination. In some embodiments, a floor distribution unit may have one receptacle for each of the six phase combinations. In some embodiments, a floor distribution unit may have two or more receptacles for each of the six phase combinations. In some embodiments, a floor power distribution may have outputs for only some of the phase combinations (for example, AB, BC, and AC only). In certain embodiments, a floor distribution unit may receive and/or distribute two-phase power. In certain embodiments, a floor distribution unit may receive and/or distribute a single phase (for example, hot, neutral, and ground).

Rack power distribution unit 114 includes rack PDU receptacles 156. In one embodiment, rack PDU receptacles 156 are IEC 60320 C20 receptacles. All of rack PDU receptacles 156 may be wired in parallel with one another. In typical operation of data center 150, any or all of rack PDU receptacles 156 may be used to supply power to computer systems in rack 54. In the embodiment shown in FIG. 2A, the leftmost two of rack PDU receptacles are used to provide power to computer systems 54 in rack 52.

Backfeed system 120 includes synchronization receptacle panel 130. Synchronization panel receptacle panel 130 includes synchronization receptacles 160. Backfeed unit input 134 includes phase selection plug 162.

FIG. 2B illustrates a backfeed connection to receptacles on a rack power distribution unit. Backfeed plugs 140 of backfeed cables 126 are coupled to two of rack PDU receptacles 156 on rack power distribution unit 114. Although in the embodiment shown in FIG. 2B, power is backfed to two receptacles in the rack PDU, power may in various embodiments be fed to any number of receptacles in a rack PDU. The number of backfeed receptacles may depend on amount of current required by the electrical loads connected to the rack PDU. In certain embodiments, each of multiple rack PDUs in a data center may have a backfeed into only one receptacle.

In some embodiments, input coupling device 138 is a 3-pole circuit breaker. In certain embodiments, input coupling device 138 is a 3-pole miniature circuit breaker (MCB). Coupling device 138 may be installed in a breaker panel in floor power distribution unit 112. Each pole of the three poles may be connected to one of the three-phases, namely, A, B, or C.

Once backfeed cables 126 have been coupled to rack power distribution unit 114 to be backfed and floor power distribution unit 112 has been coupled to a power source (in this case, floor power distribution unit 112), the power on the lines of input cables 124 and backfeed cables 126 may be tested for synchronization. In some embodiments, synchronization is as further described below relative to FIG. 3. In some embodiments, one or more of meters 136 are used to test any or all of the following parameters: wave form, line voltage, frequency, phase sequence, and phase angle. In addition, stability of various parameters may be assessed. Synchronization may include establishing a match between the pair of backfeed lines 164 in backfeed cable 126 and a combination of input lines 166 from floor power distribution unit 112. For example, for the embodiment shown in FIGS. 2A-2C, by probing backfeed lines 164 and input power lines 166 (for example, on the load side of coupling device 138), it may be determined the voltage and phasing on backfeed lines in is a BC phase combination. The power characteristics, such as line voltage, frequency, etc. of the BC input lines may be measured and compared to the power characteristics of the feed lines. Based on the synchronization test, a user may couple backfeed unit input cable 134 on paralleling panel 132 to receptacle BC on synchronization receptacle panel 130, as shown in FIG. 2C. Coupling of phase selection cable 134 to receptacle BC on phase synchronization receptacle panel 132 may establish a backfeed to computer systems 54 in rack 52. In the arrangement shown in FIG. 2C, computer systems 54 may receive a parallel power feed, one feed from floor PDU receptacle 154, and another from the backfeed into rack PDU receptacles 156.

Figure 2D:
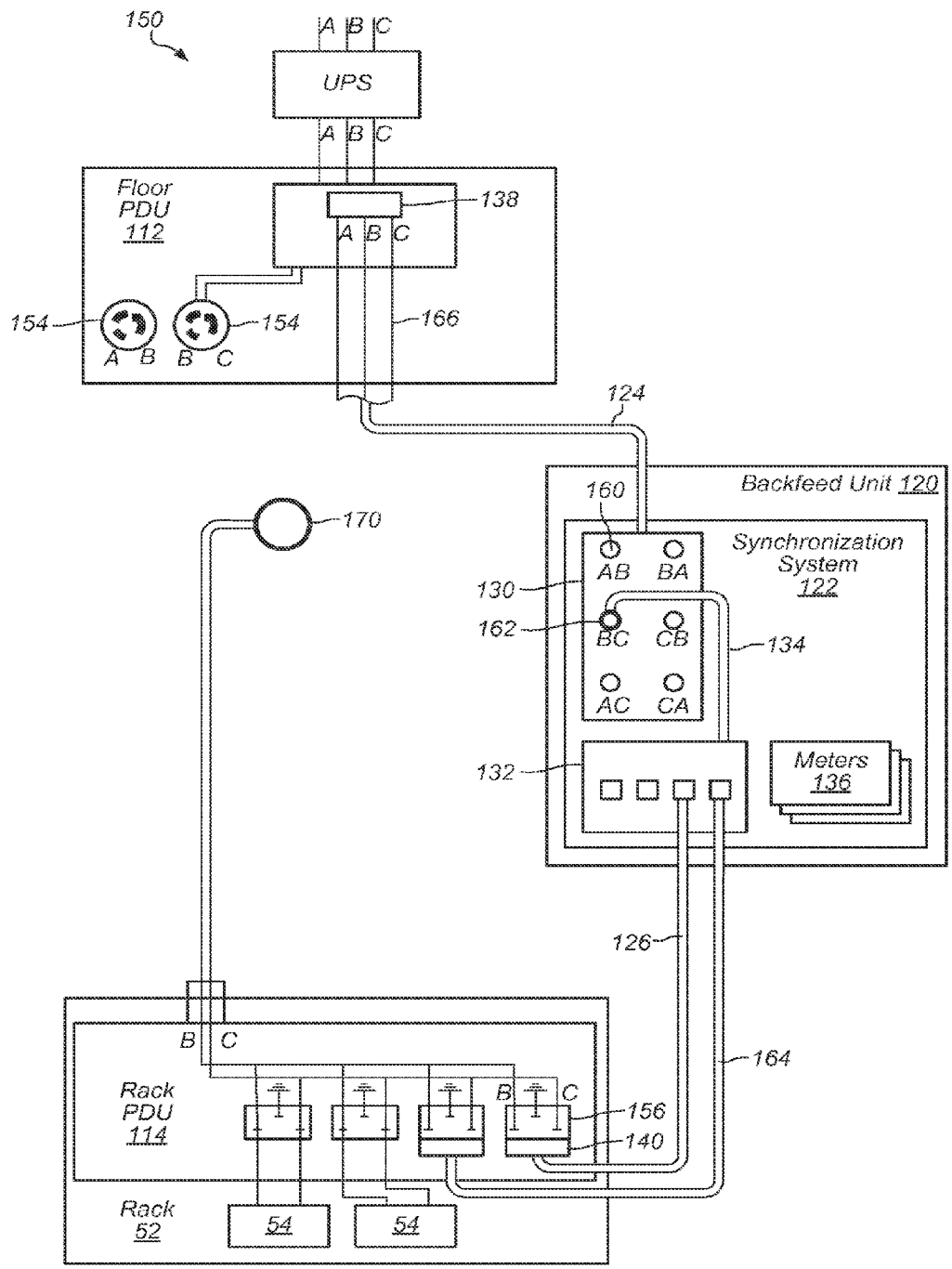
Figure 2E:
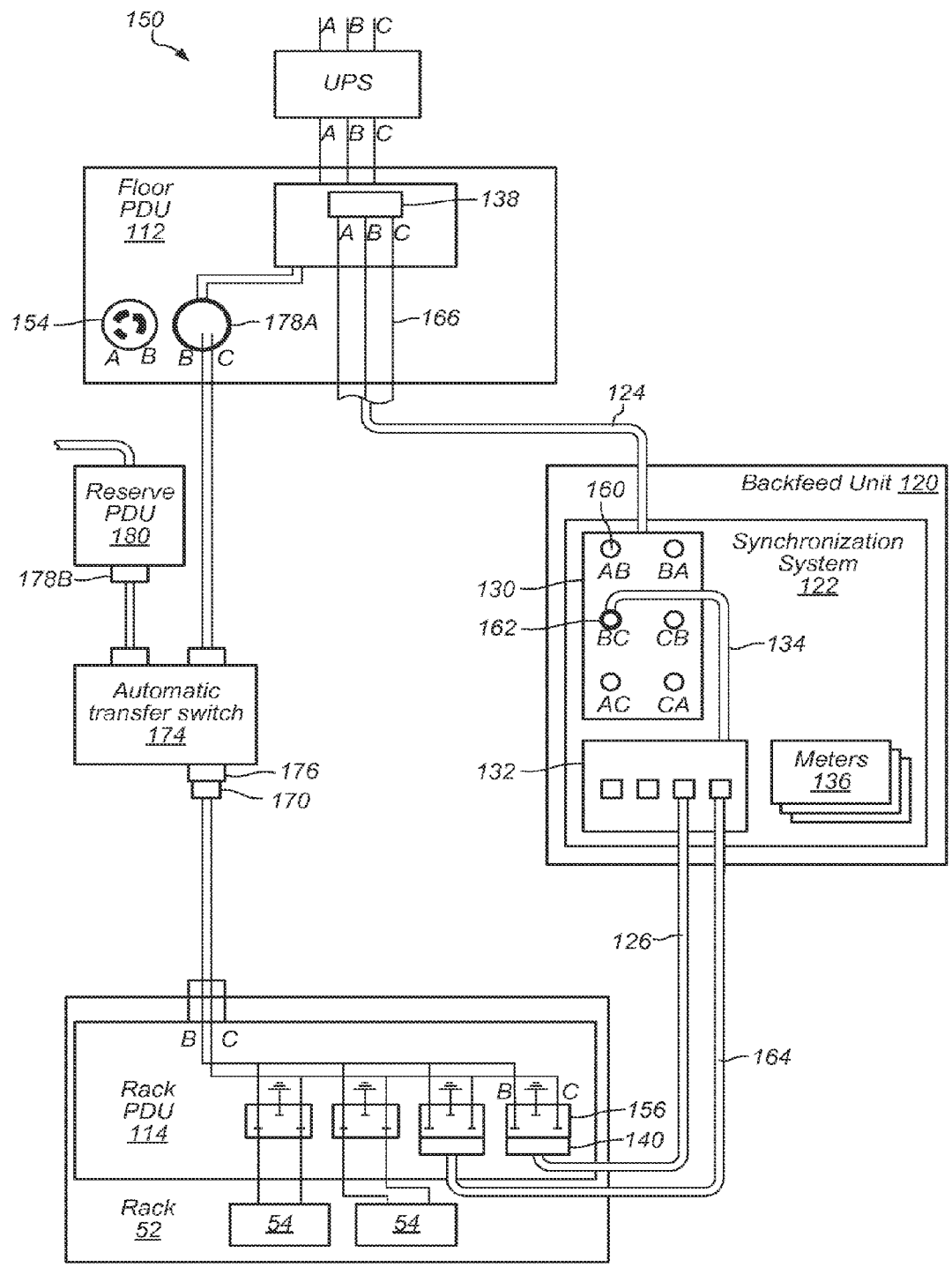

In some embodiments, reconfiguration or maintenance operations are performed under live conditions (for example, while maintaining servers in a powered up state and performing computing operations using the servers). In one embodiment, computer systems in a rack are maintained live while an automatic transfer switch is installed between a floor power distribution unit and a rack power distribution unit for the computer systems. The installed automatic transfer switch may be used, for example, to switch to a reserve power system. FIGS. 2D-2E illustrate one embodiment of installing an automatic transfer switch for reserve power system for a rack system in a data center. The installation may be carried out in a "live" environment in which the computer systems in the rack remain in operation. As reflected in FIG. 2D, a backfeed has been established as described in FIGS. 2A-2C. In addition, power plug 170 of rack power distribution unit 114 has been disconnected from floor power distribution unit 112. Computer systems 54 continue to receive power through the feed from backfeed unit 120.

As reflected in FIG. 2E, automatic transfer switch 174 may be installed between floor power distribution unit 112 and rack power distribution unit 114. Power plug 170 of rack power distribution unit 114 may be coupled to the output receptacle 176 of automatic transfer switch 174. Input power plug 178A of automatic transfer switch 174 (the "A" side of the automatic transfer switch) may be connected to floor PDU receptacle 154 in floor power distribution unit 112. (Input power plug 178A may be installed into the same receptacle that input power plug 170 of rack power distribution 114 was previously installed in.) At this point, primary power may be reestablished from floor PDU receptacle 154. Backfeed system 120 may be disconnected from rack power distribution unit 114.

As reflected in FIG. 2E, input power plug 178B of automatic transfer switch 174 (the "B" side of the automatic transfer switch) may be connected to reserve PDU 180, which may be part of a reserve power system. The reserve power system may remain coupled to provide back-up power to computer systems 54 in rack 52.

In some embodiments, a reserve power system provides reserve power for all of the computer systems 54 supplied by primary power systems 106. In some embodiments, the reserve power system is powered up at all times during operation of data center 50. The reserve power system may be passive until a failure of one or more components of primary power side 100, at which time the reserve power system may become active.

If automatic transfer switches are to be installed in additional rack systems, backfeed system 120 may be used to provide a backfeed to such racks by repeating the procedure as described above.

In various embodiments, a backfeed to a power distribution is supplied by tapping an element in a power chain that is upstream from backfed power distribution unit. As illustrated in the embodiments shown in FIG. 2A-2E, for example, a backfeed to a rack power distribution unit 56 may be supplied from a floor power distribution unit 112. Floor power distribution unit 112 is upstream from, and supplies power to, rack power distribution unit 56. In another embodiment, a backfeed may be supplied from an uninterruptible power supply in the primary power system (such as UPS 110 of primary power system 100 shown in FIG. 1. A backfeed may be supplied from any power source, however. For example, a backfeed may be supplied from a floor power distribution unit in a data center other than the floor power distribution unit 114, from a reserve power system, or a source external to the data center.

Figure 3:
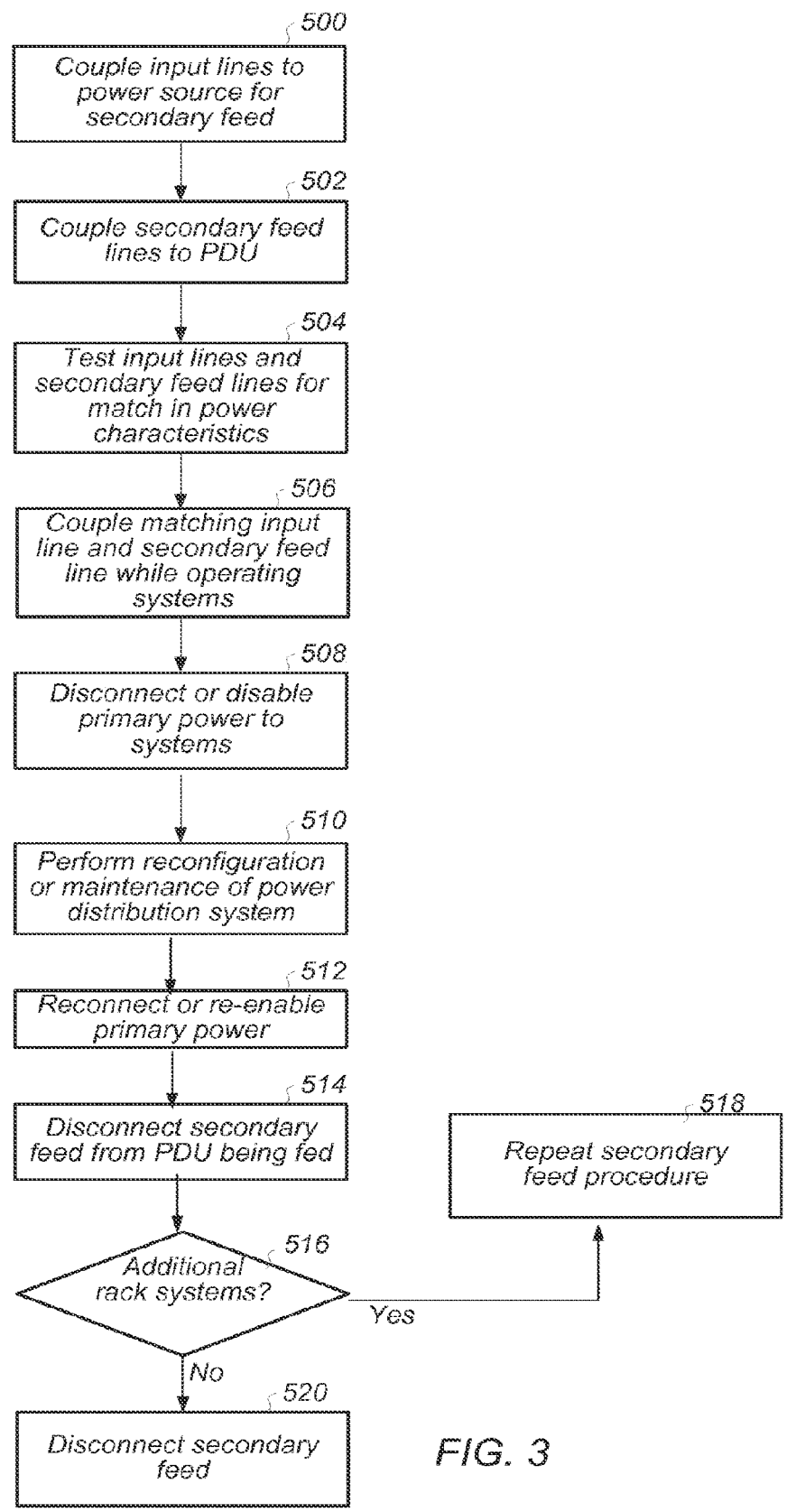
FIG. 3 illustrates one embodiment of adding a power feed to computer systems in a data center and performing reconfiguration or maintenance operations while the computer systems remain in operation.

In some embodiments, a power feed is added to systems in a data center while the systems are in operation. The power feed may be accomplished, in some embodiments, by backfeeding a power distribution unit in the data center. FIG. 3 illustrates one embodiment of adding a secondary power feed to computer systems in a rack in a data center and performing reconfiguration or maintenance operations while the computer systems remain in operation. In some embodiments, reconfiguration or maintenance operations may be repeated for various racks in a data center all the way to the rack PDU level without removing power from the components in the racks.

As operations may be performed "hot", electrical safety precautions may be utilized, which may include ensuring that: (1) all electrical safety procedures are followed; (2) personal protective equipment is used; (3) proper change management/configuration management is in place, identifying the specific rack(s) being back-fed and notifying the proper personnel; and (4) the primary feed to the server rack(s) has no abnormal conditions that would jeopardize the rack during a secondary feed process. For example, power characteristics such as voltage deviation, frequency deviation, and phase deviation may be determined to be within acceptable ranges, for example, within plus or minus 5%. Throughout the process, multiple connectors may be energized since an additional power source is being introduced. Precautions may be taken that these connectors are carefully handled, and properly insulated.

At 500, a set of input lines is coupled to a power source such that the input lines are connected to alternating current ("AC") power from a power source. In one embodiment, the power source is another floor power distribution unit in a primary power distribution system (for example, if space is not available for a circuit breaker in the primary floor PDU feeding the rack PDU). In some embodiments, the criteria for using a PDU as a power source for a feed include the following two conditions: (1) the alternate PDU is fed from the same UPS as the source PDU; and (2) the voltages on matching phases are within a predetermined variance of each other (and same frequency). In one embodiment, the predetermined variance is 7 volts AC or less.

In some embodiments, a backfeed system such as described herein relative to FIG. 1 may be used to establish a feed to a rack. In some embodiments, the backfeed unit includes a synchronization receptacle panel and a paralleling panel, such as paralleling panel 132 described above relative to FIG. 1 and/or described below relative to FIG. 4. The paralleling panel may provide a path from the synchronization receptacle panel to the power distribution unit to be back fed. In other embodiments, a special cable may be used to provide the back-feed from the synchronization receptacle panel to the power distribution unit to be backfed. In one embodiment, the end of the cable that couples with a rack PDU is a male C19 and the end of the cable that couples with the synchronization panel is a NEMA L6-30P. Other connectors and cable arrangements may be used in various embodiments. In certain embodiments, a cable may have a Y-arrangement, utilizing two other male IEC 60320 C19 connectors at one end, or two IEC 60320 C13 connectors at one end.

In one embodiment, a 3-pole breaker is installed in a floor PDU to provide a backfeed to a rack PDU. Enough cable may be left exposed on the load side of the breaker to be able to measure the current on each phase with a tong ammeter or a grip ammeter. Once installed, the 3-pole breaker may be shut.

Equipment for establishing a feed, such as backfeed system 120 described above relative to FIG. 1, may be staged in any suitable location. In one embodiment, the backfeed unit is positioned at the end of row to prevent interference with other server racks. In certain embodiments, test and/or feed equipment may be mounted on a cart.

At 502, a set of secondary feed lines is coupled to a power distribution unit that is supplying primary power to one or more systems in the data center. The secondary line feed may be into a rack-level PDU that supplies power to a rack (for example, a 5 KVA 208 V×24 Amp PDU). In some embodiments, the secondary lines are coupled as a backfeed to one or more output receptacles in a power distribution unit (such as a non-active C19 connector). The output receptacles may be connected in parallel with output receptacles that are supplying primary power to one or more systems in the data center. The phasing on the circuit on the rack to be back-fed (for example, A-B, B-C, or C-A) may be identified. Any number open output receptacles may be backfed. The number of receptacles may be based, for example, on load requirements of the systems receiving power from the rack power distribution unit.

In some embodiments, the backfeed may be synchronized with power from the power source. At 504, the secondary feed lines and input lines are tested to determine a match between a pair of lines in the set of secondary feed lines and a pair of lines in the set of input lines to match the phase of a pair of secondary feed lines with the phase of the a pair of input lines. Matching may include determining characteristics including wave form, line voltage, frequency, phase sequence, and phase angle. In some embodiments, an oscilloscope is used for testing of various characteristics.

Using a meter, the potential difference between the feed lines and the input lines may be checked to ensure that the phases line up. In some embodiments, one or more meters may be built into a synchronization system for secondary feed. In certain embodiments, the meter may be a multimeter. If the phases are reversed, then an alternate receptacle may be used for the same phase combination (for example, BA instead of AB).

In some embodiments, the power source for a secondary feed may be a PDU other than the primary floor PDU for the circuit in the rack. In such embodiments, a maximum variation may be established for the potential. In one embodiment, the potentials allowed to differ by no more than of 7 VAC. In another embodiment, the potential is allowed to differ by no more than 5%. In some embodiments, phase integrity may be verified by two electricians.

At 506, a pair of secondary feed lines is coupled to the matching input lines while primary power is maintained to the systems and the systems are operating, which may establish a secondary feed to the systems. Verification may be made that the computer systems being fed by the secondary feed are operating properly. In addition, the load bearing capacity of the feed may be assessed, for example, via an amprobe on the load side of a 3-pole breaker coupled to the power source.

At 508, primary power is disabled or disconnected at a point in the primary power chain.

At 510, reconfiguration or maintenance operations may be performed on the power distribution system while primary power is disconnected or disabled and the secondary feed is supplying power to the systems. For example, as described above relative to FIGS. 2D-2E, a backfeed may be used to carry out a live power cut-over during installation of an ATS at the rack level. After installation, the load bearing capacity of the PDU circuit through the ATS may be verified, for example, using an amprobe on the load side of the circuit.

At 512, after performing the at least one reconfiguration or maintenance operation, the primary power system may be reconnected or re-enabled.

At 514, the secondary feed may be disconnected from the power distribution unit being fed. Tests may be performed to verify that the rack is operating properly, and that no alarms are present at the PDU or UPS.

At 516, a determination is made whether reconfiguration or maintenance procedures are needed for additional racks.

If so, all or part of the procedure may be applied to additional racks at 518. In some embodiments, the input feed lines may remain connected to the same power source while reconfiguration or maintenance is performed on several racks in a data center. In some embodiments, a secondary feed may be established to numerous PDUs. For each PDU, tests may be performed to establish the appropriate phase and whether a match exists before connecting the input lines to a backfeed line for the PDU. For example, the rack PDU for a one rack may have power with an AB phase combination, the rack PDU for another rack may have power with a CB phase combination, and so on. In some cases, a single rack PDU may have sets of receptacles on different phase combinations. Thus, in some embodiments, a backfeed procedure may be performed multiple times on a single rack PDU (for example, once for each phase combination on the rack PDU from which power is being supplied).

In some embodiments, input lines may be switched to a different power source (such as a different floor PDU) when reconfiguration or maintenance is performed for different racks.

When no more circuits will be back-fed, the breaker coupling the input lines to power source may be opened and removed from the power source at 520.

Although in the examples described above, the secondary feed or backfeed was established by feeding into a power distribution unit, in certain embodiments, a secondary or tertiary feed may be established by feeding into other elements in a power distribution system. In certain embodiments, a secondary feed is established by backfeeding into a remote power panel.

Although in the examples described above, a secondary feed is made into a rack-level PDU, a secondary power feed may in various embodiments be supplied to any component in a system. In one embodiment, a backfeed is established into output receptacles of a floor PDU, such as floor power distribution unit 114 described above relative to FIG. 1. The power source may come from any source, such as different floor PDU, a UPS, or other system. A floor PDU back feed may be established, for example, to replace a circuit breaker in the floor PDU.

Figure 4:
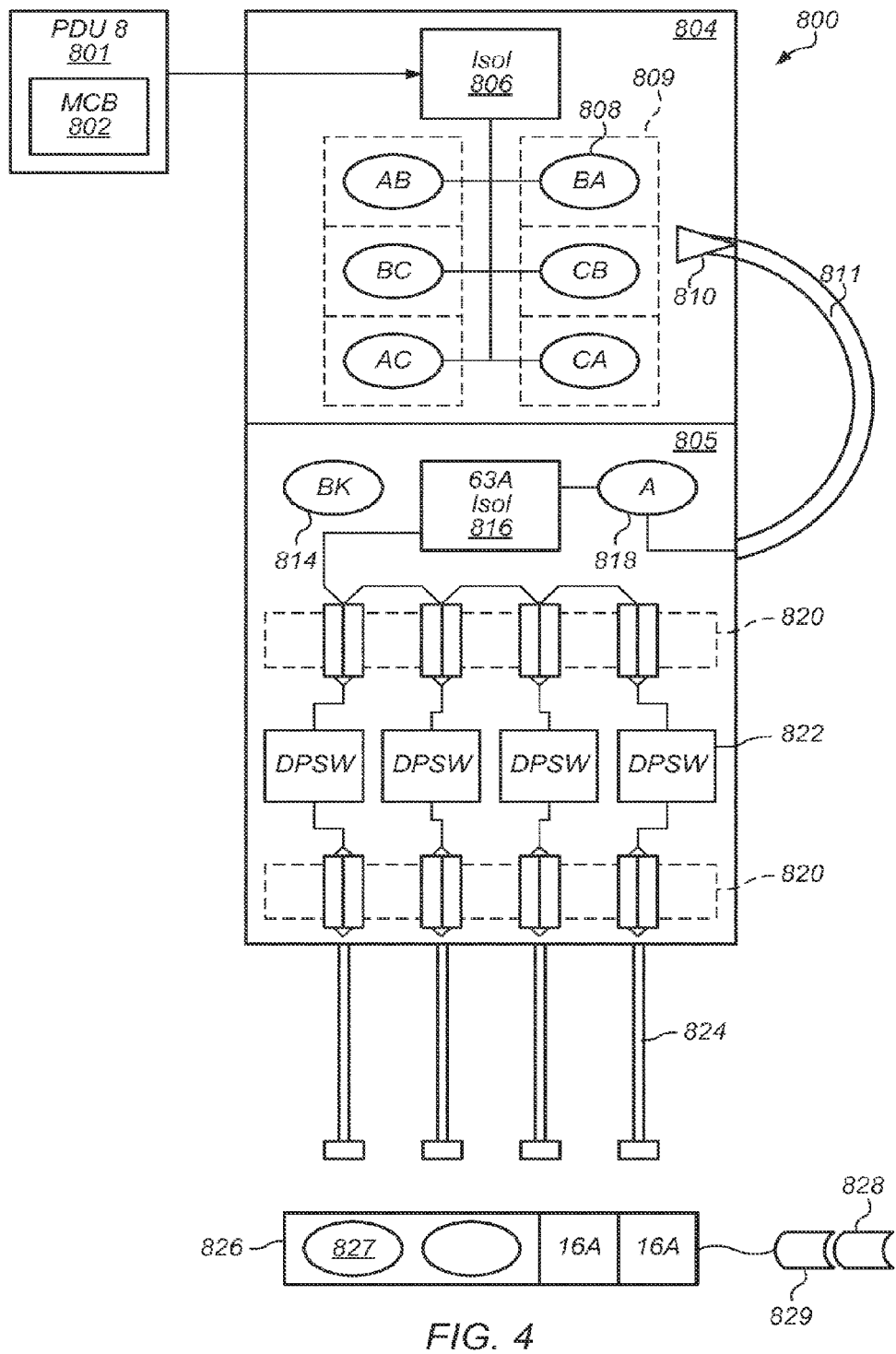
FIG. 4 is a schematic diagram illustrating one embodiment of a feed system that may be used to provide a back feed.

FIG. 4 is a schematic diagram illustrating one embodiment of a feed system that may be used to provide a back feed. Feed system 800 includes receptacle panel 804 and paralleling panel 805. Feed system 800 may receive power from donor PDU 801. Feed system 800 may be coupled to donor PDU 801 by way of MCB 802. In one embodiment, MCB is a 30 amp, 3-pole D curve MCB.

Receptacle panel 804 includes isolator 806 and receptacles 808. In one embodiment, isolator 806 is door mounted (lockable) paralleling isolator rated AC23, 63 amps, with test points provided on both sides of the isolator. One receptacle 808 may be provided for each of the various phase combinations from donor PDU 801.

The components of receptacle panel 804 may be housed in an enclosure. The components of paralleling panel 805 may be housed in a separate enclosure. In certain embodiments, each of receptacles 808 is housed in a separate enclosure, as illustrated by boxes 809.

Paralleling panel 805 includes plug 810, cable 811, receptacle 814, isolator 816, ammeter 818, terminal rails 820, isolators 822, and flex cords 824. Isolator 816 may be a door mounted (lockable) paralleling isolator rated AC23, 63 amps, with test points provided on both sides of the isolator. Isolators 822 may be double pole, door mounted (lockable), rated at 20 amps.

Plug 810 is provided at the end of cable 811. Receptacle 814 may provide a safe housing for plug 810. In one embodiment, plug 810 is NEMA L6-30P and receptacles 808 and 814 are NEMA L6-30R.

Flex cords 824 may be glanded to the enclosure of paralleling panel 805 or may be connected by plug and receptacle. Cable glands may be included to provide sealing and/or strain relief for flex cords 824 where flex cords 824 pass into the enclosure of paralleling panel 805. Flex cords 824 may be routed to rack PDU 826.

Flex cords 824 may be coupled in receptacles 827 of rack PDU 826. Rack PDU 826 may include plug 829. Receptacle 828 may be provided for safe housing of input plug 829.

Figure 5:
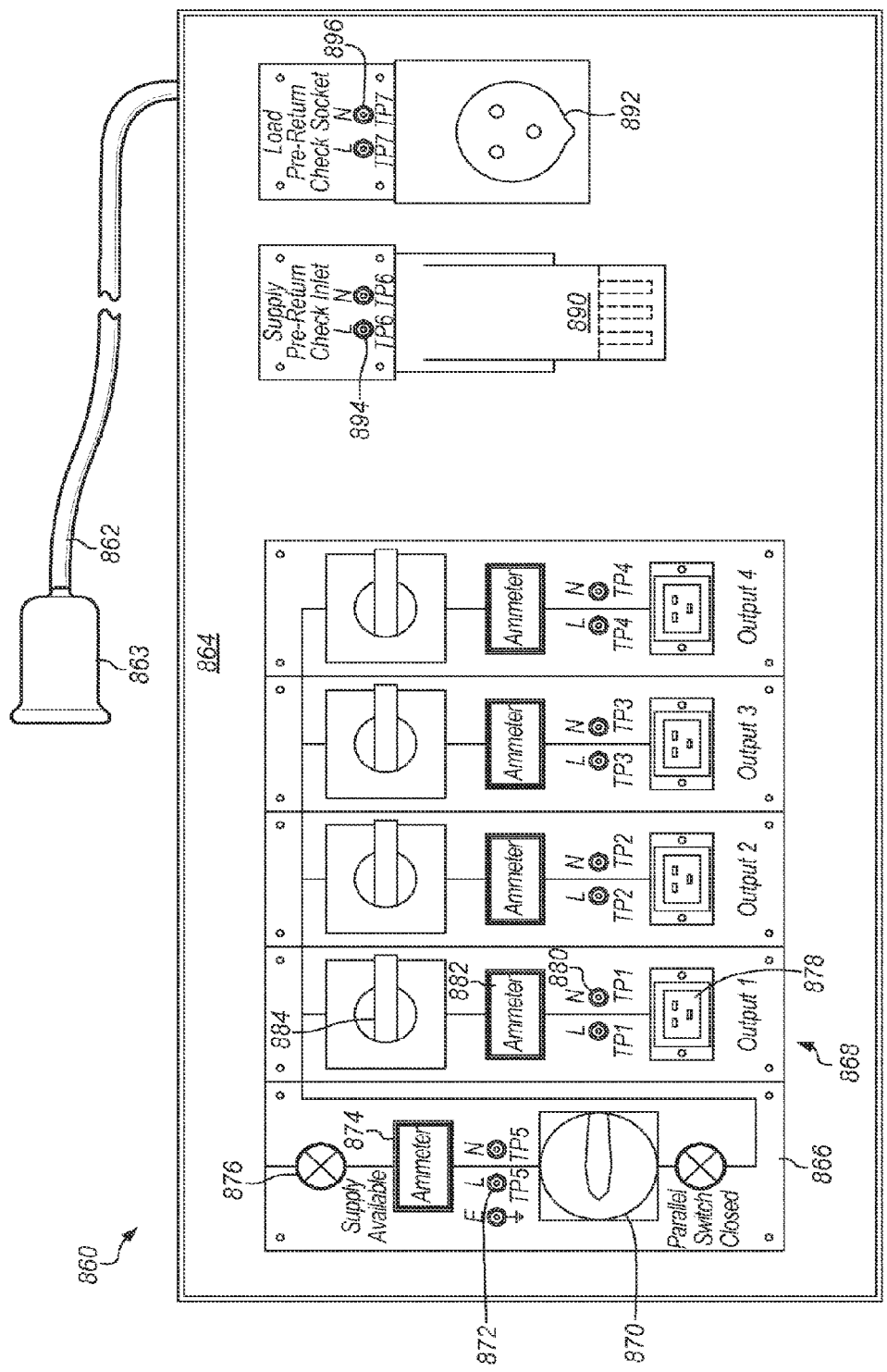
FIG. 5 illustrates a front panel view of one embodiment of a backfeed control unit.

FIG. 5 illustrates a front panel view of one embodiment of a backfeed control unit. A backfeed control unit may be used, for example, as a paralleling panel in the backfeed unit described above relative to FIG. 1. Backfeed control unit 860 includes front panel 864 and input cable 862. Input cable 862 may couple with a power source, either directly or through an intermediate system such as receptacle panel 804 described above relative to FIG. 4. Master control 866 and outputs 868 are provided on front panel 864. Master control 866 includes master switch 870, test points 872, ammeter 874, and indicator lamps 876. Each of outputs 868 includes output receptacle 878, test points 880, ammeter 882, and switch 884.

Input cable 862 includes plug 863. In one embodiment, plug 863 is a IEC 60309 2P+NE, 32 A plug. In another embodiment, plug 863 is a L6-30P plug.

Power may be routed from input cable 862 to each of outputs 868. Ammeter 874 may provide a visual indicator of a current level in input cable 862. Ammeters 882 may provide a visual indication of a current level in each of outputs 868. Switches 870 and 884 maybe used to control power outputs 868.

Backfeed control unit 860 includes supply pre-return check inlet 890 and load pre-return check socket 892. Supply pre-return check inlet 890 includes test points 894. Load pre-return check socket 892 includes test points 896.

Figure 6:
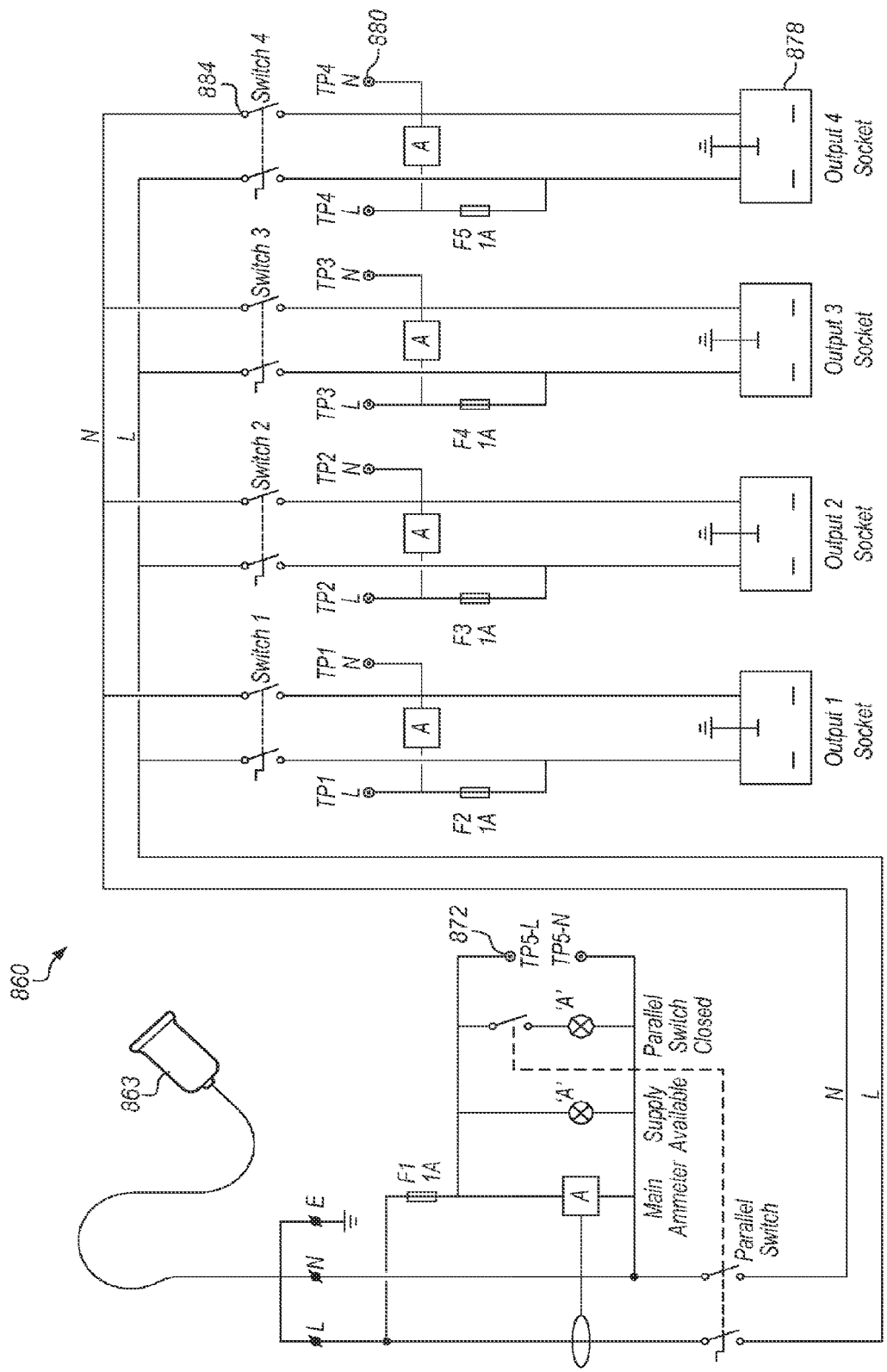
FIG. 6 is a schematic diagram illustrating input, master control, and output portions of a backfeed control unit according to one embodiment.
Figure 7:
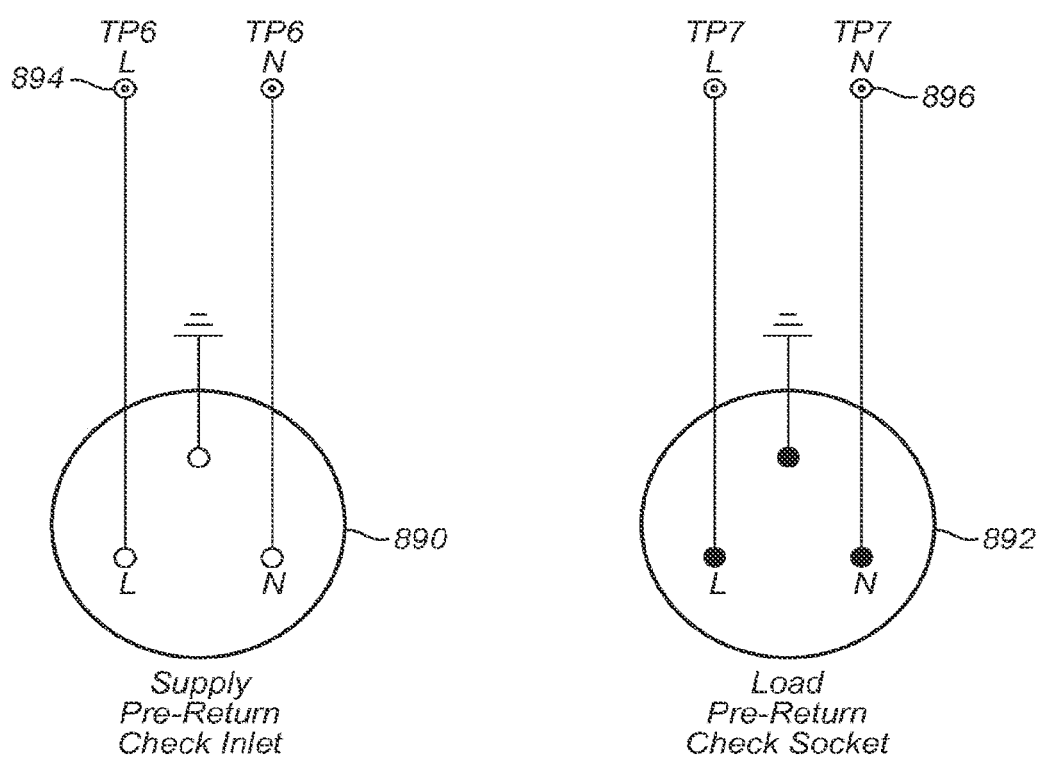
FIG. 7 is a schematic diagram illustrating supply pre-return check inlet and load pre-return check socket portions of a backfeed control unit according to one embodiment.

FIG. 6 is a schematic diagram illustrating the input cable 862, master control 866, and output 868 portions of backfeed control unit 860 according to one embodiment. FIG. 7 is a schematic diagram illustrating the supply pre-return check inlet 890 and load pre-return check socket 892 portions of backfeed control unit 860 according to one embodiment. In one embodiment, supply pre-return check inlet 890 is a IEC 60309 2P+NE, 32 A male connector portion and load pre-return check socket 892 is a IEC 60309 2P+NE, 32 A receptacle.

In various embodiments described above, a synchronization system provides for manual testing for synchronization between a power source and a power distribution unit to be fed. In certain embodiments, however, testing to establish synchronization may be performed automatically or semi-automatically, for example, by a processor in a synchronization system. In addition, in some embodiments, coupling of a power source (via, for example, a set of input lines) with a power distribution unit to be fed (via, for example, a set of secondary feed lines to the PDU) may be performed automatically or semi-automatically, for example, by a processor in a synchronization system.

In various embodiments described above, a feed system is wired to provide any combination of phases from a three-phase power source. A feed system may, however, provide other types of power (for example, two-phase, single phase). In one embodiment, a secondary feed system receives two-phase power from a power source and allows synchronization for any combination of phases of the two-phase power. In one embodiment, a secondary feed system receives single-phase power (for example, one hot and one neutral) from a power source and allows synchronization with any phase and neutral of a poly-phase system.

In various embodiments described above, a secondary feed is established for systems during operation of the systems. In certain embodiments, however, some or all of the systems in a data center may be taken out of operation during establishment of a secondary feed.

Although in some embodiments described herein, an additional feed is a secondary feed connected in parallel to a single primary feed, power feeds may, in various embodiments, be added to systems having any number of existing feeds. Thus, an additional power feed may be a secondary power feed, a tertiary power feed (for example, a feed to a system receiving power from two existing power systems), etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
coupling a power distribution unit to another power distribution unit, via one or more primary power lines, while electrical power is being supplied, via a backfeed system, to one or more computer systems electrically coupled with the power distribution unit,
wherein the backfeed system comprises one or more lines that are coupled to an output receptacle of the power distribution unit,
wherein the one or more lines transmit electrical power via the backfeed system to the output receptacle of the power distribution unit, and
wherein the power distribution unit transmits the electrical power from the output receptacle of the power distribution unit to the one or more computer systems coupled with the power distribution unit, and
subsequent to said coupling, additionally transmitting via the power distribution unit electrical power from the primary power lines to the one or more computer systems coupled with the power distribution unit.

2. The method of claim 1, wherein coupling the power distribution unit to the other power distribution unit, via the one or more primary power lines further comprises:
coupling an automatic transfer switch with the other power distribution unit; and
coupling the power distribution unit with the automatic transfer switch.

3. The method of claim 2, further comprising coupling a secondary input of the automatic transfer switch to an additional power distribution unit.

4. The method of claim 1, further comprising, prior to coupling the power distribution unit to the other power distribution unit:
coupling the one or more lines of the backfeed system to the output receptacle of the power distribution unit;
coupling a set of input lines of the backfeed system to the other power distribution unit such that the input lines are connected to at least one phase of AC power from the other power distribution unit;
testing the one or more lines and the set of input lines to determine a match, wherein determining the match comprises matching a phase of at least one pair of lines with a phase of the at least one pair of input lines; and
coupling the at least one pair of lines to the matching at least one pair of input lines while primary power is maintained to the one or more computer systems and while the one or more computer systems are operating.

5. The method of claim 4, further comprising, after said coupling at least one pair of lines to the matching at least one pair input lines and prior to coupling the power distribution unit to the other power distribution unit:
disconnecting one or more of the one or more primary power lines from the power distribution unit or from the other power distribution unit.

6. The method of claim 5, wherein prior to disconnecting the one or more primary power lines, a connection between the power distribution unit and the other power distribution unit via the one or more primary power lines does not include an automatic transfer switch.

7. The method of claim 1, further comprising:
repairing or replacing one or more components included in a connection between the power distribution unit and the other power distribution unit.

8. A method comprising:
providing electrical power via a backfeed system to one or more computer systems electrically coupled with a rack power distribution unit,
wherein the backfeed system comprises one or more lines that are coupled to an output receptacle of the rack power distribution unit and one or more lines that are coupled with another power distribution unit,
wherein the one or more lines coupled with the other power distribution unit receive electrical power from the other power distribution unit and transmit the electrical power via the backfeed system to the output receptacle of the rack power distribution unit, and
wherein the rack power distribution unit transmits the electrical power from the output receptacle of the rack power distribution unit to the one or more computer systems coupled with the rack power distribution unit.

9. The method of claim 8, wherein the other power distribution unit is a floor power distribution unit of a data center power system.

10. The method of claim 8, further comprising, prior to said providing electrical power via the backfeed system to the one or more computers:
coupling one or more lines of the backfeed system to the output receptacle of the rack power distribution unit;
coupling a set of input lines of the backfeed system to the other power distribution unit such that the input lines are connected to at least one phase of AC power from the other power distribution unit;
testing the one or more lines and the set of input lines to determine a match between at least one pair of lines of the one or more lines and at least one pair of lines in the set of input lines, wherein determining the match comprises matching the phase of the at least one pair of lines with the phase of the at least one pair of input lines; and
coupling the at least one pair of lines to the matching at least one pair of input lines while primary power is maintained to the one or more computer systems and the one or more computer systems are operating.

11. A system comprising:
a rack power distribution unit electrically coupled with one or more computer systems;

another power distribution unit; and a backfeed system comprising one or more lines coupled to an output receptacle of the rack power distribution unit and one or more lines coupled with the other power distribution unit, wherein the one or more lines coupled with the other power distribution unit are configured to receive electrical power from the other power distribution unit and transmit the electrical power via the backfeed system to the output receptacle of the rack power distribution unit, and wherein the rack power distribution unit is configured to transmit the electrical power from the output receptacle of the rack power distribution unit to the one or more computer systems coupled with the rack power distribution unit.

12. The system of claim 11, wherein the rack power distribution unit and the other power distribution unit are part of a data center power system, and wherein the other power distribution unit is a floor power distribution unit located in an upstream position of the data center power distribution system relative to the rack power distribution unit.

13. The system of claim 12, wherein the floor power distribution unit is configured to distribute electrical power having multiple phases.

14. The system of claim 11, further comprising:

one or more primary power lines coupled to the other power distribution unit and the rack power distribution unit, wherein the one or more primary power lines are coupled in parallel with the back feed system.

15. The system of claim 14, further comprising:

an automatic transfer switch, wherein the automatic transfer switch is coupled with the one or more primary power lines and is coupled in an electrical flow between the other power distribution unit and the rack power distribution unit.

16. The system of claim 15, wherein the automatic transfer switch comprises at least two inputs, wherein one of the inputs of the automatic transfer switch is coupled with one of the one or more primary power lines, and wherein another one of the inputs of the automatic transfer switch is coupled with another power source.

17. The system of claim 16, wherein the other power source is a reserve power distribution unit of a power system that includes the rack power distribution unit and the other power distribution unit.

18. The system of claim 11, wherein the backfeed system comprises:

at least one meter configured to test synchronization of the one or more lines coupled to the output receptacle of the rack power distribution unit with the one or more lines coupled with the other power distribution unit.

19. The system of claim 11, wherein the backfeed system is configured to automatically determine a match between the one or more lines coupled to the output receptacle of the rack power distribution unit and the one or more lines coupled with the other power distribution unit.

20. The system of claim 11, wherein the system is configured to automatically couple at least a pair of at least one of the one or more lines coupled to the output receptacle of the rack power distribution unit with at least one of the one or more lines coupled with the other power distribution unit.

* * * * *